United States Patent
Pringnitz

(10) Patent No.: US 10,945,381 B1
(45) Date of Patent: *Mar. 16, 2021

(54) MODULAR TOOLS WITH DETACHABLE COUPLING

(71) Applicant: Wicked Tuff Gear, LLC, Kerrville, TX (US)

(72) Inventor: Todd Pringnitz, Mount Pleasant, IA (US)

(73) Assignee: OUTDOOR PRODUCT INNOVATIONS, INC., Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,689

(22) Filed: Oct. 9, 2018

Related U.S. Application Data

(63) Continuation-in-part of application No. 14/746,152, filed on Jun. 22, 2015, now Pat. No. 10,091,948.

(60) Provisional application No. 62/019,948, filed on Jul. 2, 2014.

(51) Int. Cl.
| | |
|---|---|
| *A01G 3/08* | (2006.01) |
| *B25G 1/04* | (2006.01) |
| *B23D 51/03* | (2006.01) |
| *B23D 51/01* | (2006.01) |

(52) U.S. Cl.
CPC ............ *A01G 3/083* (2013.01); *B23D 51/01* (2013.01); *B23D 51/03* (2013.01); *B25G 1/04* (2013.01)

(58) Field of Classification Search
CPC .......... A01G 3/06; A01G 3/062; A01G 3/067; A01G 3/08; A01G 3/083; A01G 3/085; B25G 1/00; B25G 1/04
See application file for complete search history.

(56) References Cited

U.S. PATENT DOCUMENTS

| | | |
|---|---|---|
| 1,797,589 A | 3/1931 | Price |
| 2,593,323 A | 4/1952 | Magnussen et al. |
| 2,867,363 A | 1/1959 | Kuemmerling |
| 3,317,997 A | 5/1967 | Hedstrom et al. |
| 3,727,956 A | 4/1973 | Popeil |

(Continued)

FOREIGN PATENT DOCUMENTS

WO     2013036967 A2     3/2013

OTHER PUBLICATIONS

Wicked Tough Hand Saw, Snagged Mar. 22, 2012 at https://www.wickedtreegear.com/wickedstory/wicked.html.

*Primary Examiner* — Andrea L Wellington
*Assistant Examiner* — Richard D Crosby, Jr.

(57) ABSTRACT

A pole saw apparatus includes a saw blade, a pole, and a tubular adapter connecting the saw blade to the pole. The adapter includes an obround blade-receiving end that stably telescopingly engage sides of the blade-receiving end, with bolts fixing the blade on the adapter. The adapter also includes a pole-engaging end that is cylindrically shaped to telescopingly engage the anchoring end of the pole. A friction clamp includes a transverse shaft extending through the pole, the shaft being shaped to slide into longitudinal slots in the pole-engaging end of the adapter and then rotate into circumferential slots where it is not longitudinally removable. A rotatable cam handle on the clamp is manipulated to create circumferential friction to hold (or release) the adapter on the pole. The blade, adapter and pole align along a common centerline for robust and balanced use.

13 Claims, 14 Drawing Sheets

(56) References Cited

U.S. PATENT DOCUMENTS

| | | | |
|---|---|---|---|
| 3,835,535 | A | 9/1974 | Robinson et al. |
| 4,167,811 | A | 9/1979 | Barrett |
| 4,211,003 | A | 7/1980 | Collins |
| 4,219,064 | A | 8/1980 | Lozano |
| 4,518,162 | A | 5/1985 | Oates |
| 4,535,539 | A | 8/1985 | Friedman et al. |
| 4,718,200 | A | 1/1988 | Miquelot |
| D300,112 | S | 3/1989 | Osterhout |
| D304,154 | S | 10/1989 | Osterhout |
| 4,911,573 | A * | 3/1990 | Pietro ............... B25G 3/16 285/361 |
| 4,958,395 | A | 9/1990 | Busskohl |
| 5,099,539 | A | 3/1992 | Forester |
| 5,138,768 | A | 8/1992 | Collins |
| 5,211,322 | A | 5/1993 | Nealy |
| D346,937 | S | 5/1994 | Backman |
| 5,326,206 | A | 7/1994 | Moore |
| 5,458,144 | A * | 10/1995 | Lavine ............... A45B 9/02 135/24 |
| 5,553,386 | A | 9/1996 | Hsu |
| 5,634,276 | A | 6/1997 | Lin |
| 5,661,868 | A | 9/1997 | Panagakos et al. |
| 5,694,695 | A | 12/1997 | Lund |
| 5,695,695 | A | 12/1997 | Lund |
| 5,706,941 | A | 1/1998 | Erisoty |
| D392,164 | S | 3/1998 | Bomgaars, Jr. |
| 5,787,536 | A | 8/1998 | Pate |
| 5,794,345 | A | 8/1998 | Ryon et al. |
| D406,039 | S | 2/1999 | Okada |
| 5,933,965 | A | 8/1999 | Lindén et al. |
| 6,008,860 | A | 12/1999 | Patton et al. |
| 6,085,681 | A | 7/2000 | Morton |
| D433,914 | S | 11/2000 | Chu |
| D444,684 | S | 7/2001 | Kimura |
| 6,253,455 | B1 | 7/2001 | Eriksson et al. |
| 6,298,564 | B1 | 10/2001 | Voser et al. |
| 6,308,419 | B1 | 10/2001 | Neshat et al. |
| 6,345,445 | B1 | 2/2002 | Schofield |
| 6,367,121 | B1 | 4/2002 | MacMillan |
| D461,999 | S | 8/2002 | Nimmo |
| 6,434,838 | B1 | 8/2002 | Mai |
| 6,446,341 | B1 | 9/2002 | Wang et al. |
| 6,526,664 | B2 | 3/2003 | Cech |
| 6,546,596 | B2 | 4/2003 | Grote et al. |
| D482,257 | S | 11/2003 | Taylor et al. |
| 6,742,264 | B1 * | 6/2004 | Urion ............... B23D 51/10 30/166.3 |
| 6,875,917 | B1 | 4/2005 | Wood et al. |
| 6,883,208 | B1 | 4/2005 | Huang |
| 6,889,917 | B2 | 5/2005 | Fahy et al. |
| 6,898,858 | B1 | 5/2005 | Spell |
| 6,925,686 | B2 | 8/2005 | Heathcock et al. |
| 7,017,234 | B2 | 3/2006 | Anderson |
| 7,065,885 | B1 | 6/2006 | Chen |
| D530,164 | S | 10/2006 | Farley |
| D530,180 | S | 10/2006 | Klecker et al. |
| D535,026 | S | 1/2007 | Griffin et al. |
| 7,331,567 | B2 | 2/2008 | Li |
| D582,243 | S | 12/2008 | Freeman et al. |
| D582,747 | S | 12/2008 | Freeman et al. |
| D588,433 | S | 3/2009 | van Deursen |
| 7,574,806 | B2 | 8/2009 | Wang |
| 7,631,389 | B2 | 12/2009 | James et al. |
| 7,721,377 | B2 | 5/2010 | Jungklaus et al. |
| 7,721,391 | B2 | 5/2010 | Bukovitz et al. |
| D637,882 | S | 5/2011 | Bloch |
| 7,958,640 | B1 | 6/2011 | Mandriota |
| 8,079,151 | B2 | 12/2011 | Chen |
| D664,823 | S | 8/2012 | Pringnitz |
| 8,266,806 | B2 | 9/2012 | Holmroos |
| 8,469,423 | B1 | 6/2013 | Crowley, Jr. et al. |
| 8,490,250 | B2 | 7/2013 | Lanz |
| 8,590,427 | B2 | 11/2013 | Murphy et al. |
| 8,595,902 | B2 | 12/2013 | Troudt |
| 8,615,889 | B2 | 12/2013 | Martinsson |
| 8,667,648 | B2 | 3/2014 | Vierck |
| 8,763,260 | B2 | 7/2014 | Ranieri et al. |
| 8,875,405 | B2 | 11/2014 | Trees et al. |
| 8,882,166 | B2 | 11/2014 | Ramsey et al. |
| 8,959,778 | B2 | 2/2015 | Baid |
| D723,891 | S | 3/2015 | Pringnitz |
| 9,050,730 | B2 | 6/2015 | Miyawaki |
| 9,101,095 | B2 | 8/2015 | Pringnitz |
| 9,109,616 | B1 | 8/2015 | Ballentine |
| 9,185,851 | B2 | 11/2015 | Miyawaki |
| 9,288,947 | B1 | 3/2016 | Burnette |
| 9,403,267 | B2 | 8/2016 | Ho |
| 9,532,510 | B2 | 1/2017 | Pringnitz |
| 9,591,809 | B2 | 3/2017 | Gieske et al. |
| 9,651,073 | B2 | 5/2017 | Bukovitz et al. |
| 10,091,948 | B2 | 10/2018 | Pringnitz |
| 2002/0194739 | A1 * | 12/2002 | Krane ............... A01G 3/08 30/296.1 |
| 2004/0020062 | A1 | 2/2004 | Ducret |
| 2004/0221457 | A1 | 11/2004 | Shen |
| 2005/0097691 | A1 | 5/2005 | Tsuchiya et al. |
| 2005/0141957 | A1 | 6/2005 | Chen |
| 2006/0048397 | A1 | 3/2006 | King et al. |
| 2007/0108756 | A1 | 5/2007 | Laakso et al. |
| 2010/0037469 | A1 | 2/2010 | Chubb |
| 2010/0077620 | A1 * | 4/2010 | Lin ............... A47L 13/08 30/169 |
| 2010/0170547 | A1 | 7/2010 | Pietrzak et al. |
| 2012/0102755 | A1 | 5/2012 | Racov et al. |
| 2013/0340266 | A1 * | 12/2013 | Miyawaki ............... A01G 3/083 30/517 |
| 2014/0000065 | A1 * | 1/2014 | Bukovitz ............... C08L 23/04 16/429 |
| 2015/0089821 | A1 * | 4/2015 | Troudt ............... B25G 3/18 30/519 |
| 2016/0000017 | A1 | 1/2016 | Pringnitz |
| 2016/0199973 | A1 * | 7/2016 | Wood ............... H02G 1/02 16/429 |
| 2016/0236339 | A1 | 8/2016 | Flaherty |
| 2017/0001297 | A1 | 1/2017 | DeVille |
| 2017/0079215 | A1 * | 3/2017 | Bian ............... B25F 5/02 |

* cited by examiner

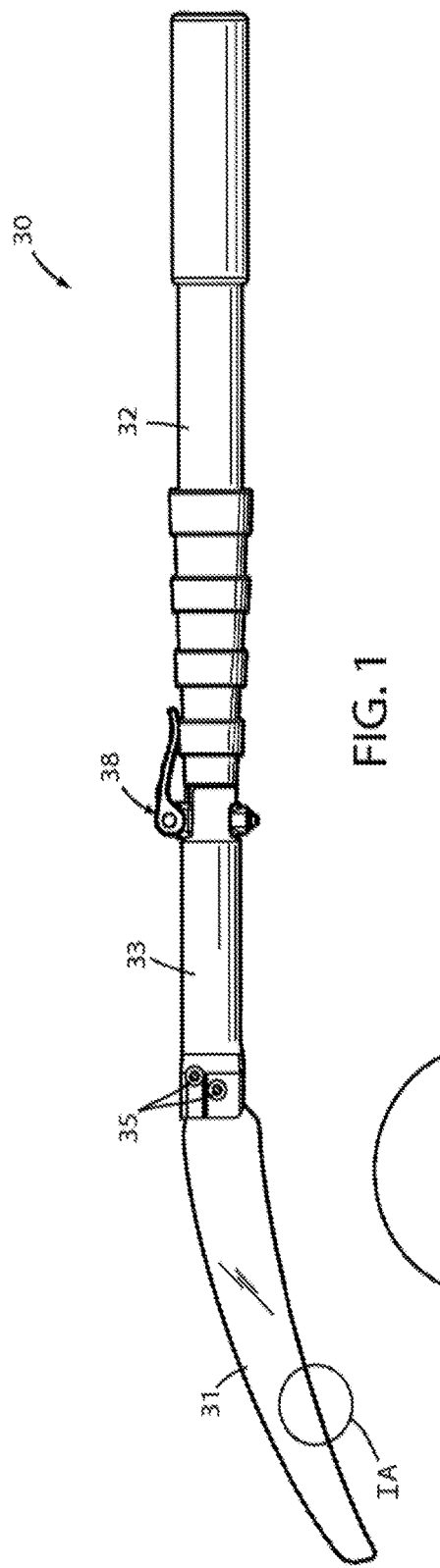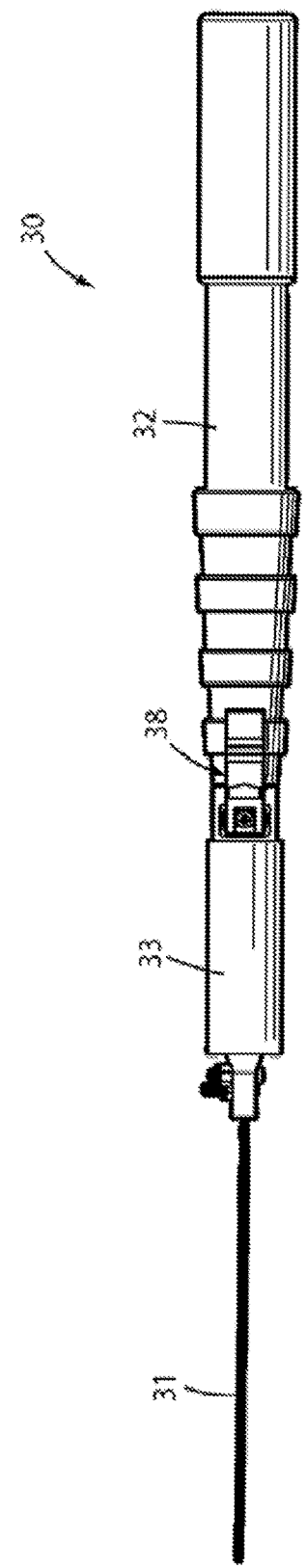

US 10,945,381 B1

MODULAR TOOLS WITH DETACHABLE COUPLING

CROSS-REFERENCE TO RELATED APPLICATIONS

The present patent application is a continuation-in-part of and claims the benefit of priority to U.S. patent application Ser. No. 14/746,152, filed Jun. 22, 2015 and issued as U.S. Pat. No. 10,091,948, which in turn claims the benefit of priority under 35 U.S.C. § 119(e) to U.S. Provisional Application Ser. No. 62/019,948, filed Jul. 2, 2014. The present patent application is also related to U.S. Pat. No. 9,532,510, issued Jan. 3, 2017. Each of the foregoing patent applications and patent are incorporated by reference in its entirety for any purpose whatsoever.

BACKGROUND

The present disclosure relates to pole saws, and more particularly to a durable pole saws that are light in weight but made with a robust design from durable components for rough outdoor use.

Pole saws with collapsible poles allow the user to trim tree limbs at many different heights, effectively and efficiently. Preferably, the saws are made with a robust and durable design since the saws are often subject to abuse and difficult operating conditions. Weight can also be an issue, since hunters and outdoorsmen may carry the saw into the woods, or gardeners and landscapers may carry the saw around a yard as they are working. Ergonomics is also important, including an ability to use the saw comfortably when the pole is extended or retracted. Notably, the outdoor saw industry is competitive, such that part and assembly costs must be minimized, and the total number of parts also minimized. It is desired to provide a pole saw that ergonomically addresses these challenges.

SUMMARY OF THE DISCLOSURE

In one aspect of the present disclosure, a pole saw apparatus includes a saw blade with an apertured end for attachment; a pole with an anchoring end for attachment; and a tubular adapter having a blade-receiving end and a pole-engaging end, the blade-receiving end being obround and shaped to stably telescopingly engage sides of the blade-receiving end, the pole-engaging end being cylindrically shaped to telescopingly engage the anchoring end of the pole and including longitudinal slots leading into the pole-engaging end and circumferential slots extending partially around the pole-engaging end. At least one fastener engages aligned holes in the apertured end and in the tubular adapter to secure the apertured end in place. A clamp includes a shaft that extends transversely through the pole-engaging end, the shaft being shaped to slip into the longitudinal slots in the anchoring end of the pole and then rotate into the circumferential slots so that the shaft cannot slide longitudinally out of engagement with the pole-engaging end; the clamp further including a cammed handle that is movable between a loose position where the pole-engaging end can be rotated and slid longitudinally in the anchoring end, and that is movable to a clamped position where the pole-engaging end is clamped and frictionally prevented from rotation and/or sliding in the anchoring end.

In a further aspect of the present disclosure, the clamp includes first and second tube-engaging pieces, the first tube-engaging piece having a first cylindrical surface engaging the anchoring end of the pole and having an arcuate surface operably slidably engaging a cam on the cammed handle so that when rotated, the cammed handle pulls the shaft to thus tension the second tube-engaging piece laterally to create friction.

In accordance with a further aspect of the present disclosure, the at least one fastener includes two bolts fixing the saw blade, holding the blade in-plane with a centerline of the adapter and in-plane with a centerline of the pole.

In accordance with still a further aspect of the present disclosure, a sleeve of foam on the adapter forms a handle that is ergonomically shaped and located adjacent and in-line with the blade.

In another aspect of the present disclosure, a pole saw apparatus comprises a saw blade, a pole, and a tubular adapter connecting the saw blade to the pole. The adapter includes a blade-receiving end that is obround to stably telescopingly engage sides of the saw blade, with bolts fixing the blade on the adapter. The adapter also includes a pole-engaging end that is cylindrically shaped to telescopingly engage the pole. A friction clamp includes a transverse shaft in the pole that is shaped to slide into longitudinal slots and then rotate into circumferential slots in the pole-engaging end of the tubular adapter so that the adapter cannot be longitudinally removed. The friction clamp further includes a rotatable cam handle that can be manipulated to, when rotated, create circumferential friction to hold the adapter on the pole.

In another aspect of the present disclosure, a method includes providing a pole saw apparatus including a saw blade, a pole, and an adapter holding the saw blade on the pole; sawing a high branch while holding the pole using the apparatus; disconnecting the pole from the adapter; and sawing a low branch while holding the adapter without the pole attached.

In another aspect of the present disclosure, a pole saw apparatus includes a saw blade, a pole, a tubular adapter connecting the saw blade to the pole, and a scabbard configured to slip onto and protect the saw blade from damage and abuse when not in use, the scabbard including a friction-generated biased retainer holding the scabbard on the saw blade when positioned on the blade.

These and other aspects, objects, and features of the present disclosure will be understood and appreciated by those skilled in the art upon studying the following specification, claims, and appended drawings.

BRIEF DESCRIPTION OF THE DRAWINGS

FIGS. 1-2 are side and top views of an illustrative apparatus in accordance with the present disclosure, with FIG. 1A showing an enlarged area including saw teeth.

DETAILED DESCRIPTION

Figure 5:
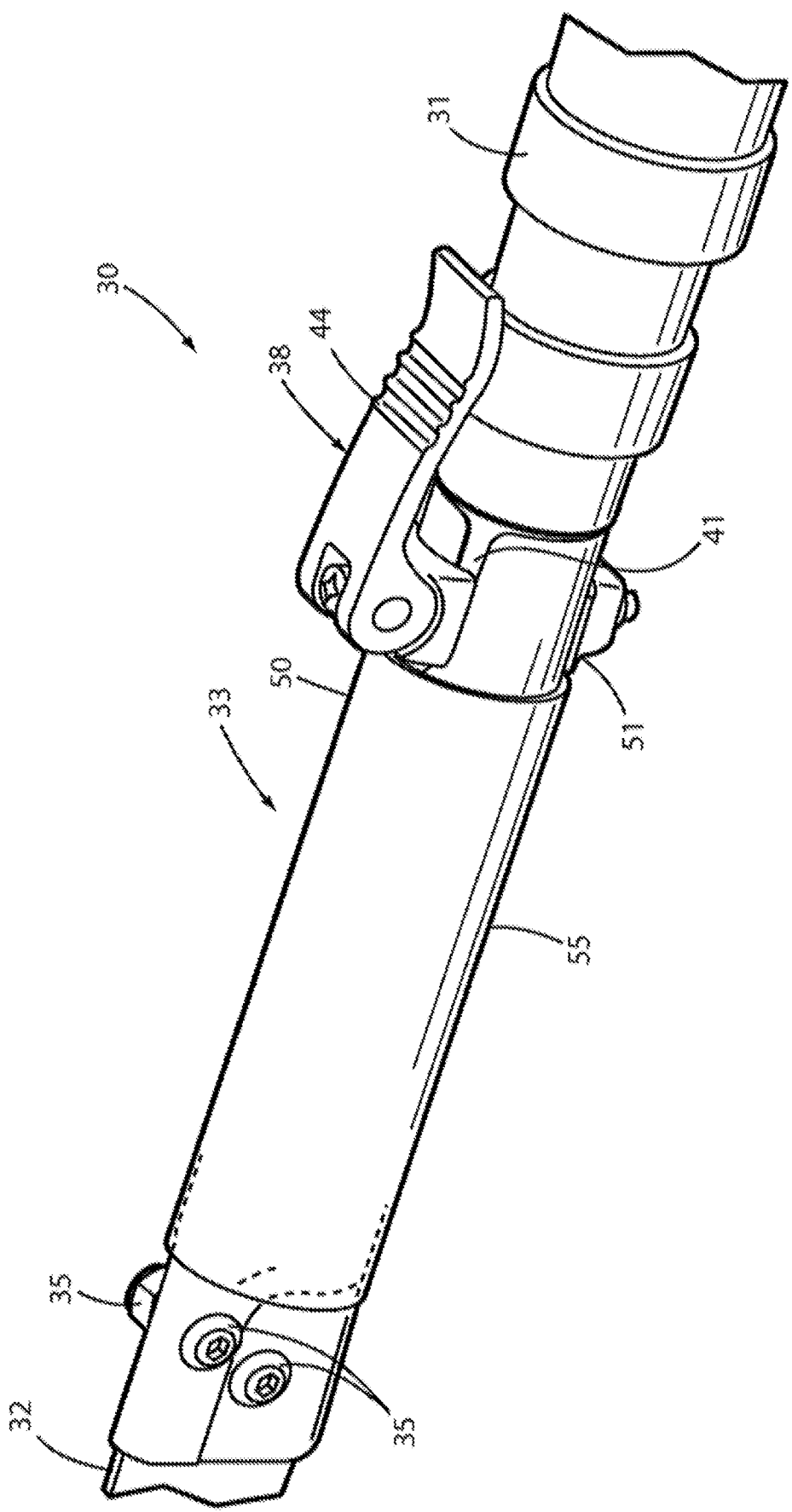
FIG. 5 is an enlarged view of the adapter attached to the saw blade and pole in FIG. 1.
Figure 6:
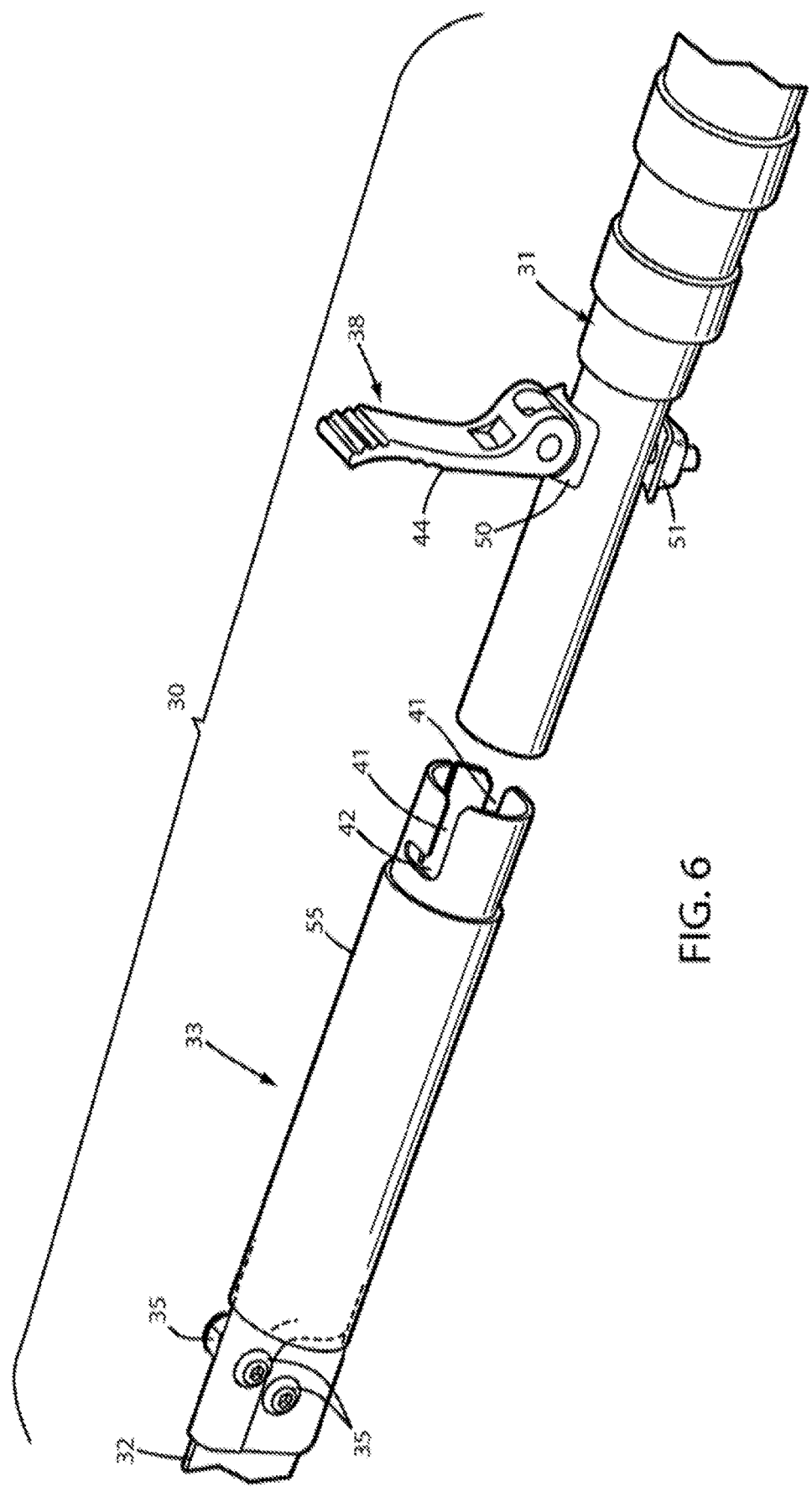
FIG. 6 is an enlarged view of the foam-covered adapter attached to the saw blade but exploded from the pole in FIG. 3.
Figure 6A:
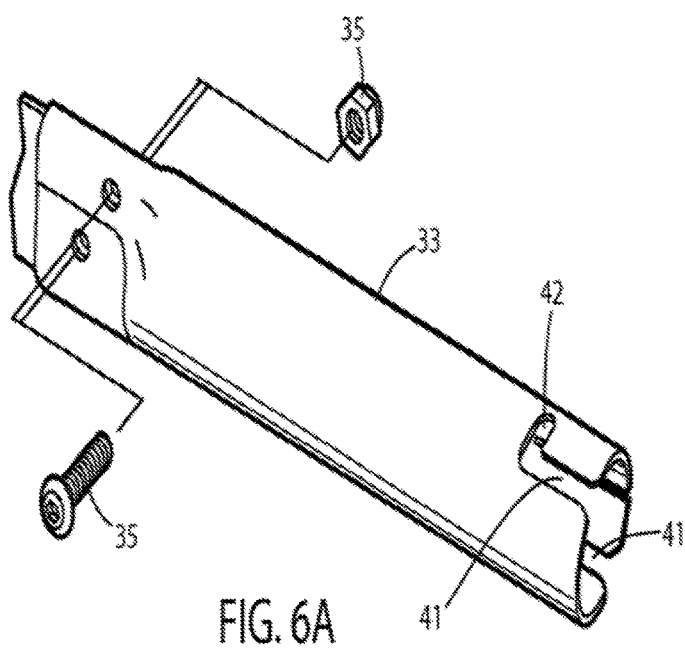
FIG. 6A is an exploded view of the adapter with the foam removed, from FIG. 6.
Figure 7:
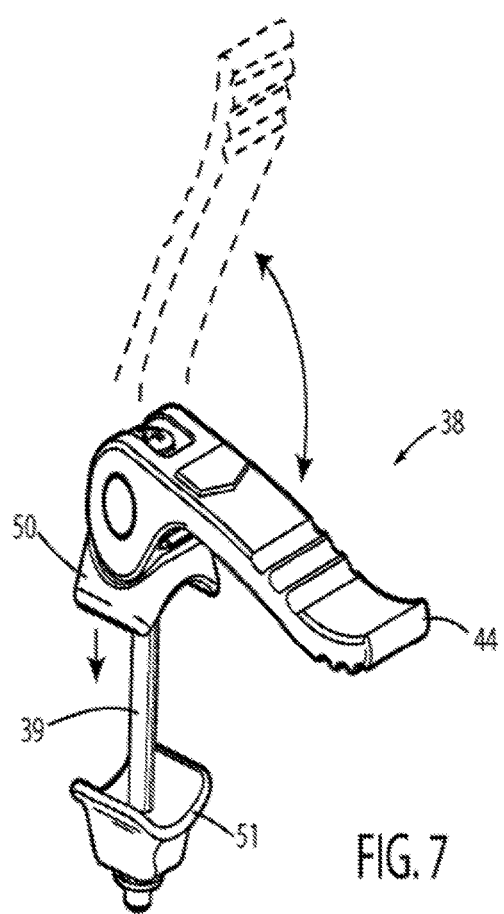
FIGS. 7-8 are perspective views of the friction clamp, FIG. 7 showing an assembly, FIG. 8 showing an exploded view.
Figure 8:
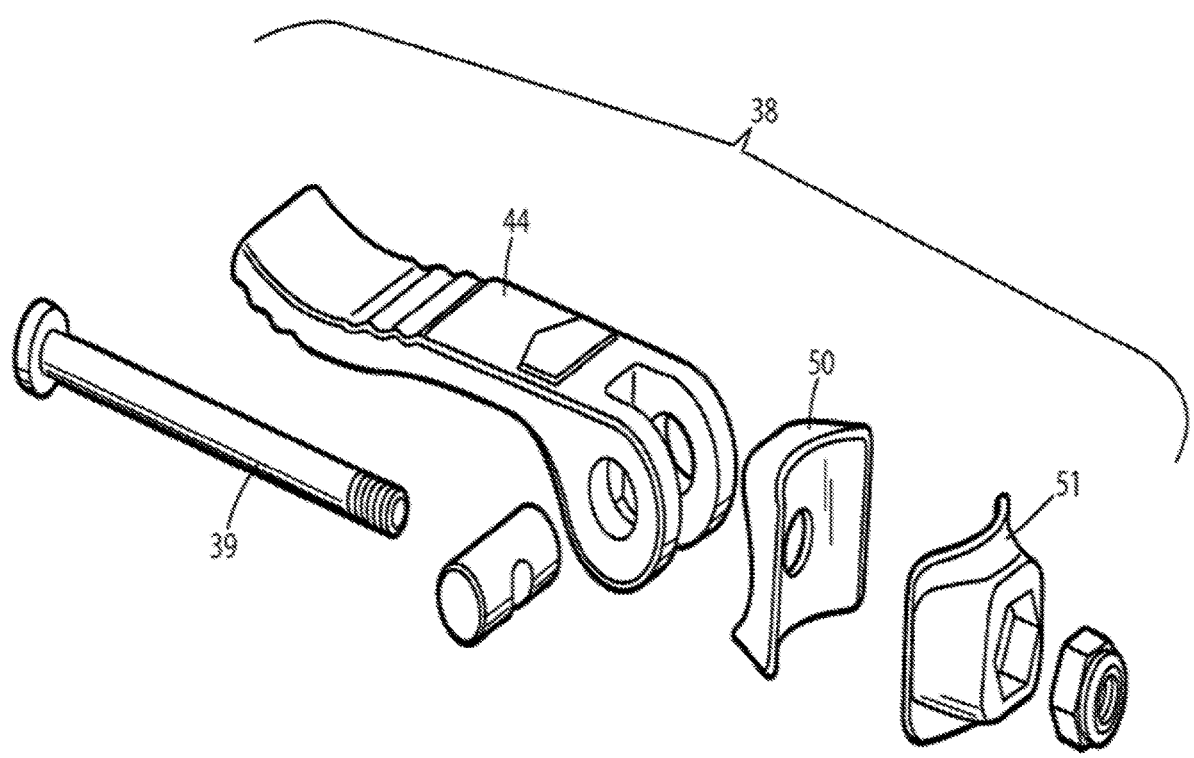
Figure 9:
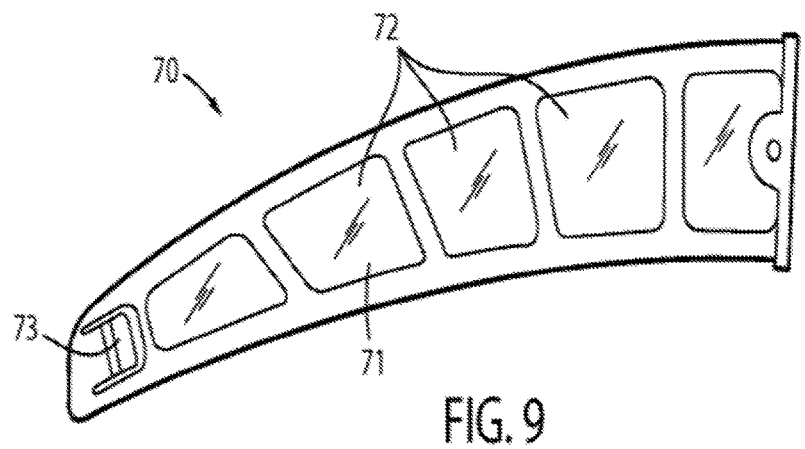
FIGS. 9-12 are side, end, top and longitudinal cross sectional views through a scabbard shaped to receive the saw blade.
Figure 10:
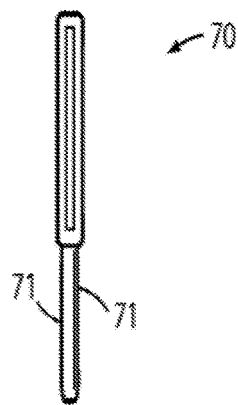
Figure 11:
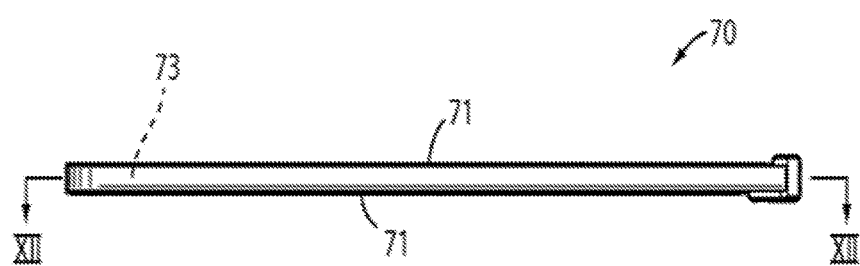
Figure 12:
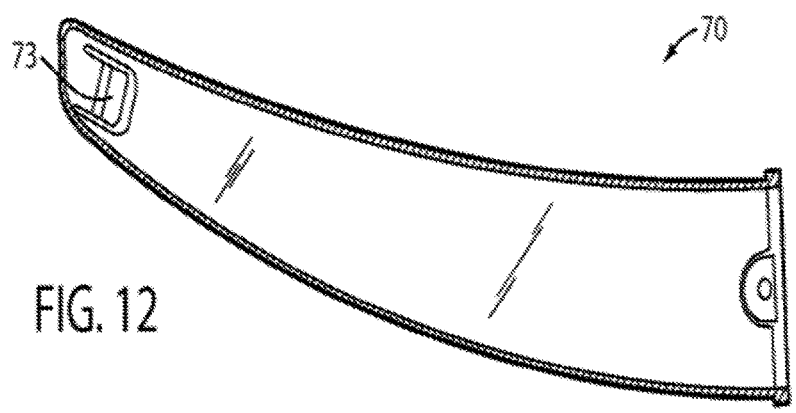

A first embodiment of a pole saw apparatus 30 (FIGS. 1-6) includes a saw blade 31, a telescopingly-extendable pole 32 (with clamps for selectively holding it in extended and collapsed positions), and a tubular adapter 33 connecting the saw blade 31 to the pole 32. The adapter 33 includes a blade-receiving end 34 that is obround (i.e. parallel flat sides with round ends joining the flat sides) to stably telescopingly engage sides of attachment end of the saw blade 31, with two fasteners 35 (i.e. nuts/bolts) fixing the blade 31 on the adapter 33. The adapter 33 (FIGS. 5-6) also includes a pole-engaging end 36 that is cylindrically shaped to telescopingly engage the pole 32. A friction clamp 38 includes a transverse shaft 39 (FIGS. 7-8) that is shaped to slide into longitudinal slots 41 and then rotate into circumferential slots 42 in the pole-engaging end of the tubular adapter 33 so that the adapter 33 cannot be longitudinally removed. The friction clamp 38 further includes a rotatable cam handle 44 that can be manipulated/rotated about an axis perpendicular to a length of the pole so that, when rotated, it pulls on (i.e. tensions) the shaft 39 to create friction to hold the adapter 33 on the pole 32. When rotated to create friction, the handle 44 of the clamp 38 rests tight against the pole, in and out-of-the-way stored position.

The saw blade 31 (FIGS. 1-2) has an apertured end with holes aligned with mating holes on the adapter 33 for receiving the fastener nuts/bolts 35. The pole 32 has a tubular cylindrical anchoring end for mating engagement with the pole-engaging end of the adapter 33. The clamp 38 (FIGS. 7-8) includes first and second tube-engaging pieces 50 and 51 on opposite ends of the shaft 39. The first tube-engaging piece 50 has a first cylindrical surface engaging the anchoring end of the pole 32 and has an opposite arcuate surface operably slidably engaging a cam on the cammed handle 44 so that when rotated, the cammed handle 44 pulls the shaft 39 to thus tension the first and second tube-engaging pieces 50 and 51 toward each other to create friction. The fastener nuts/bolts 35 securing the blade 33 (FIG. 1) preferably include two bolts, longitudinally offset for optimal stress distribution, which fix the saw blade 31 on the adapter 33 and pole 32, with a base of the blade 31 being generally in-plane with a centerline of the adapter 33 and in-plane with a centerline of the pole 32. It is noted that the illustrated blade 31 has a curve shape which facilitates sawing. However, it is contemplated that the present innovation includes differently shaped blades.

Figure 3:
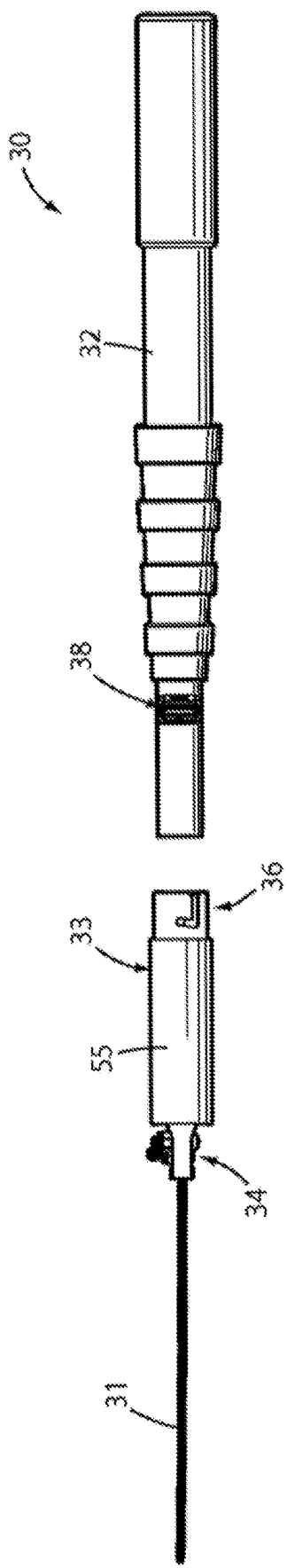
FIGS. 3-4 are side and top views of the apparatus of FIG. 1, with the saw blade and adapter exploded from the pole.
Figure 4:
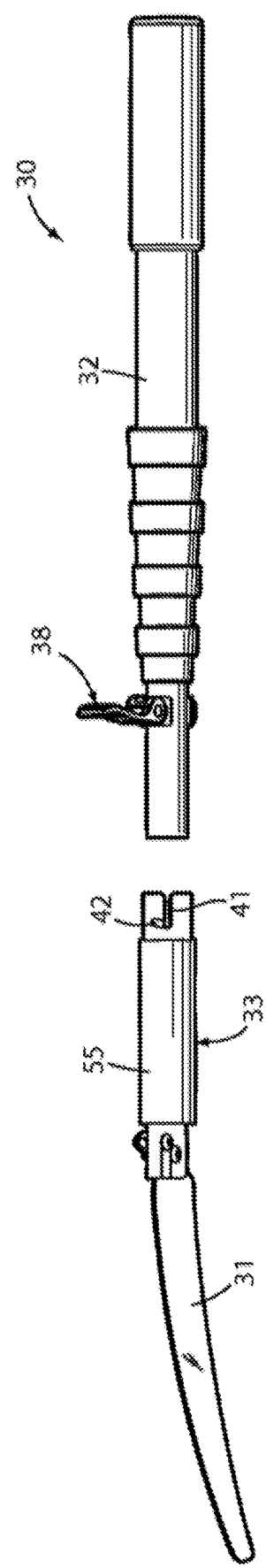

A sleeve of foam 55 covers a cylindrical outer surface of the adapter 33 to form an ergonomic handle on the adapter 33 which is ergonomically shaped, comfortable, and located adjacent and in-line with the blade 31. As shown in FIGS. 3-4, the saw blade 31 and adapter 33 form a unit that, when taken off the pole 32, can be used as a short-handled saw. The foam 55 is optimally positioned to support this separated function, ergonomically and comfortably.

FIGS. 9-12 are side, end, top and longitudinal cross sectional views through a scabbard 70 (also called a "blade cover" or "shield") shaped to cover and protect the blade 31. The scabbard 70 includes sidewalls 71 joined at top and bottom edges to define a recess shaped to mateably closely receive the blade 31. The scabbard 70 is preferably made of polymer, and includes recesses 72 formed in the sidewalls 71 to reduce total material, reduce weight, and to facilitate molding the scabbard 70. An inwardly-biased finger-like resilient retainer 73 is integrally formed in one or both of the sidewalls 71. The illustrated resilient retainer 73 includes opposing inwardly-extending resilient tabs that are biased inward to frictionally "pinchingly" engage the blade 31. The illustrated retainer 73 is positioned near an outermost end of the sidewalls 71 (near a tip of the blade 31) so that the blade 31 slides substantially fully into the scabbard 70 before the retainer 73 grips the blade 31. Also, the illustrated retainers 73 are defined by a U-shaped slot around the tab, with the root of the retainer 73 extending to the material of the sidewall 71 nearest an outer end of the scabbard, with the root acting as a leaf spring to provide an inward bias to the tabs.

Figure 13:
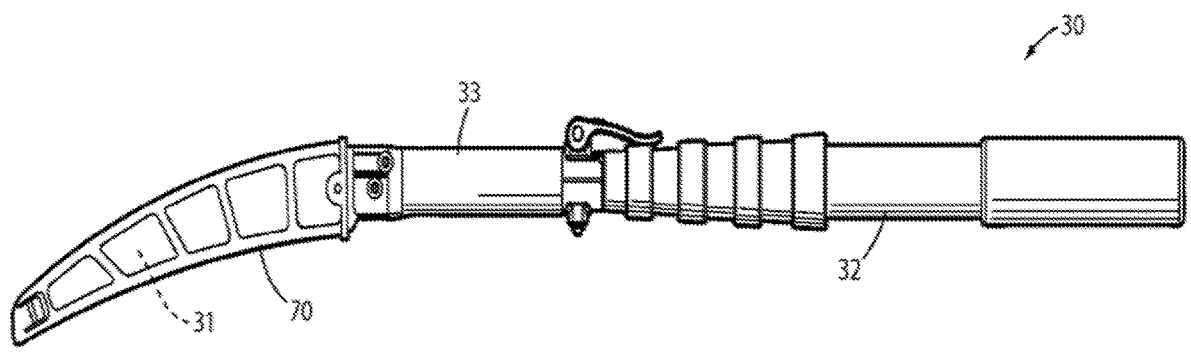
FIGS. 13-14 are side and top views showing the scabbard of FIG. 9 on the saw of FIG. 1.
Figure 14:
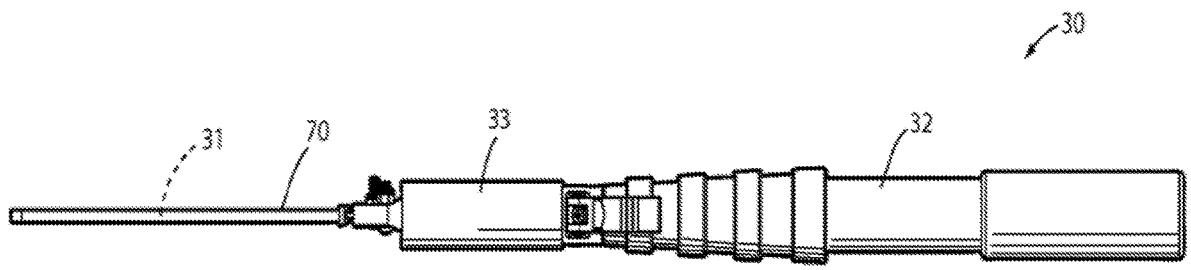

The scabbard 70 can be easily and quickly slipped onto (or off from) the blade 31 to protect the blade 31, with the scabbard's retainer 73 frictionally engaging the blade 31 to "self-retain" the scabbard 70 on the blade 31. FIGS. 13-14 are side and top views showing the scabbard 70 of FIG. 9 on the pole saw apparatus 30 of FIG. 1. It is contemplated that the scabbard 70 can be made of any durable structural polymeric material, such as a polyolefin like polypropylene, and can be made as a unitary injection molded part that does not require assembly or secondary processing. Nonetheless, a scope of the present disclosure includes alternative scabbard constructions.

FIGS. 15-24 present views of a further embodiment of a removable saw head assembly in accordance with the present disclosure. In particular, these figures present a saw head assembly (herein referred to as 100) as illustrated in FIGS. 1-4 of U.S. Pat. No. 9,532,510 suitably modified with a proximal coupling that is configured to interfit with a tubular adapter (similar to 33) for connecting the saw head 100 to the pole 32.

In particular, saw head 100 includes a blade holder, or guard or saw blade storing component 123 that can be formed, for example, of cast aluminum, injection molded polymer (e.g, with fiber reinforcement), and the like, and a blade or saw blade 124 pivoted to the guard 123 for movement between a blade-use position and a blade-protected blade-stored position wherein the blade 124 is at least partially in a recess in the component 123.

Figure 15:
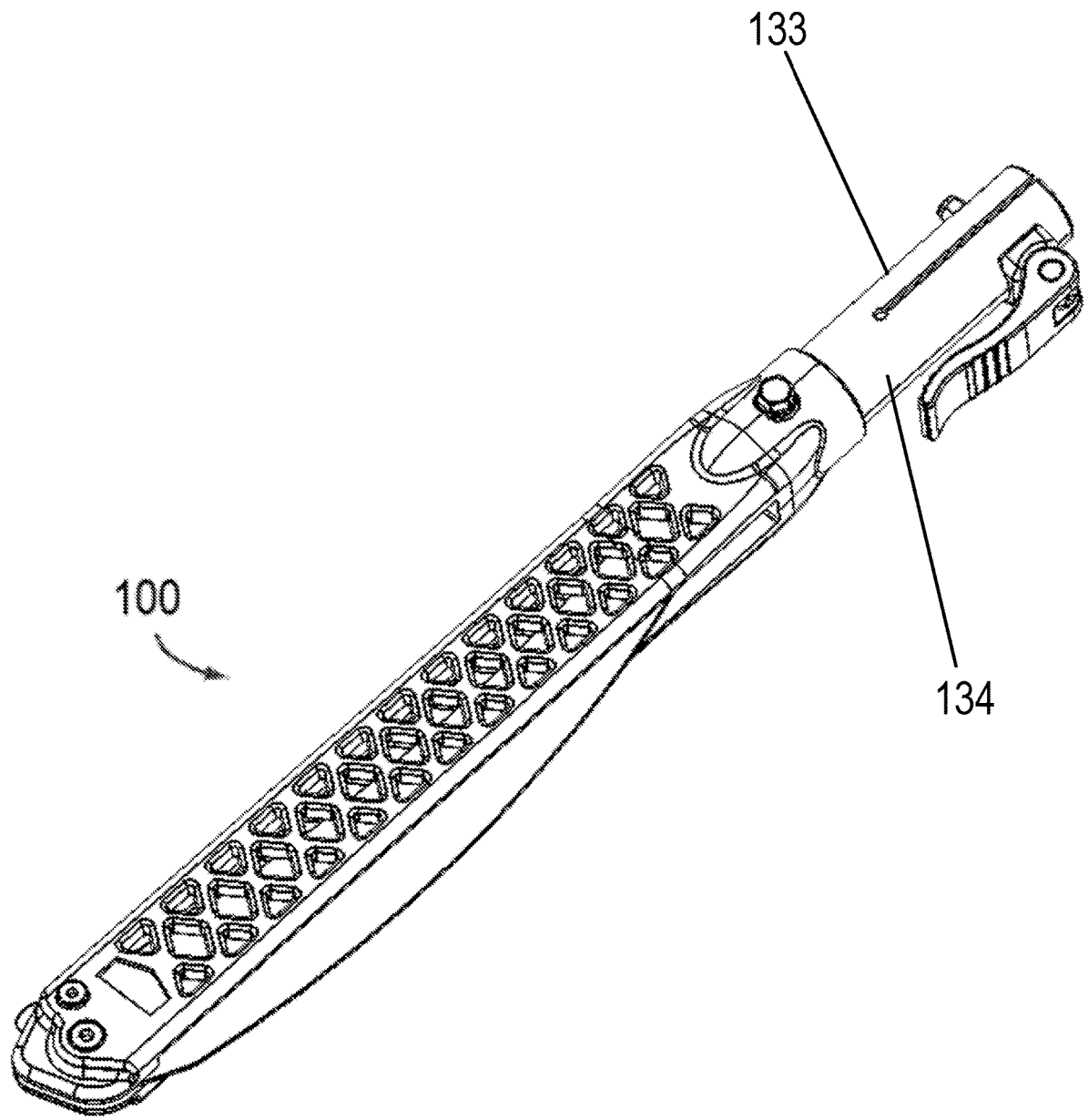
FIGS. 15-24 present views of a further embodiment of a removable saw head in accordance with the present disclosure.
Figure 16:
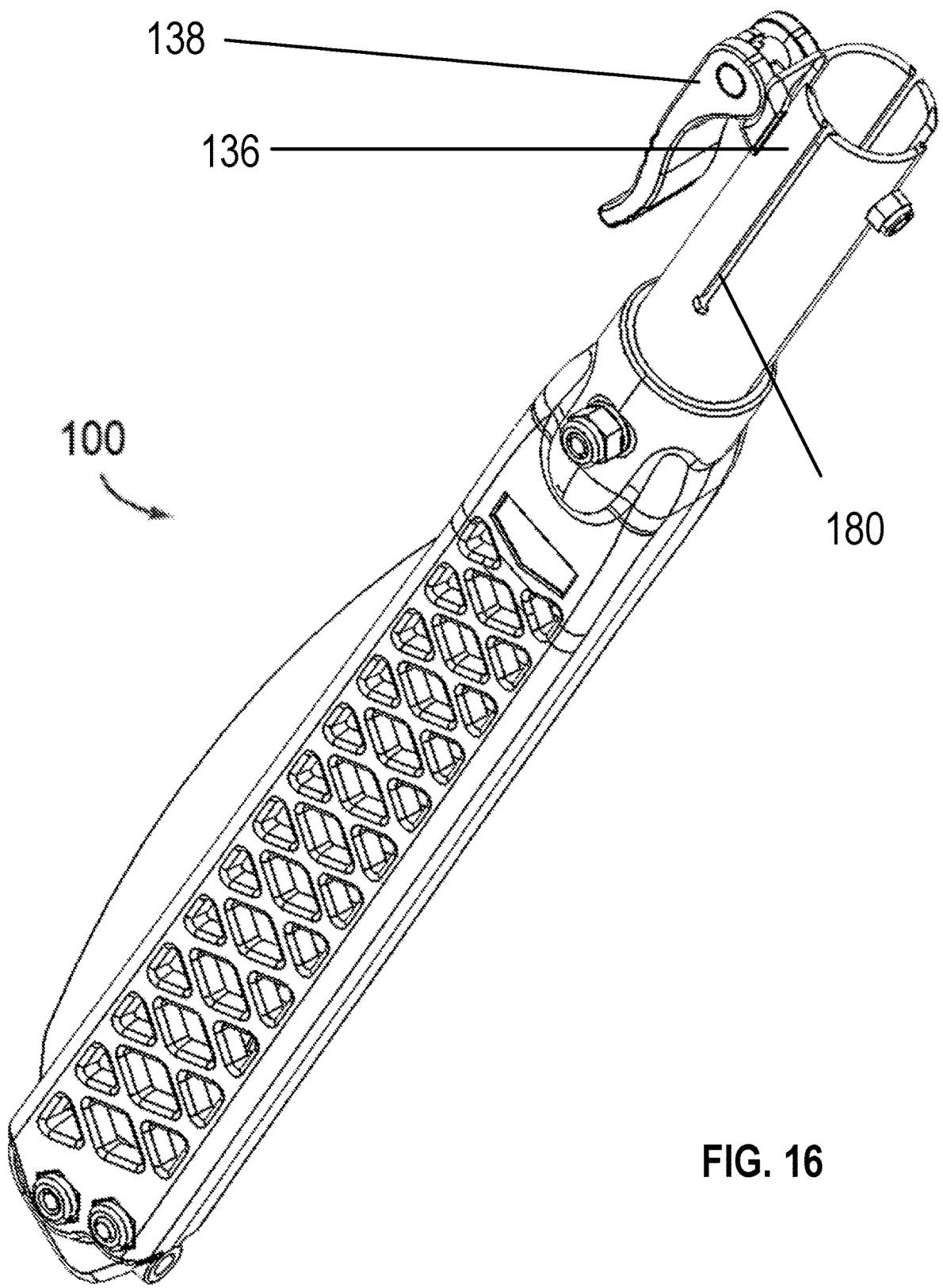
Figures 17, 18, 19, 20:
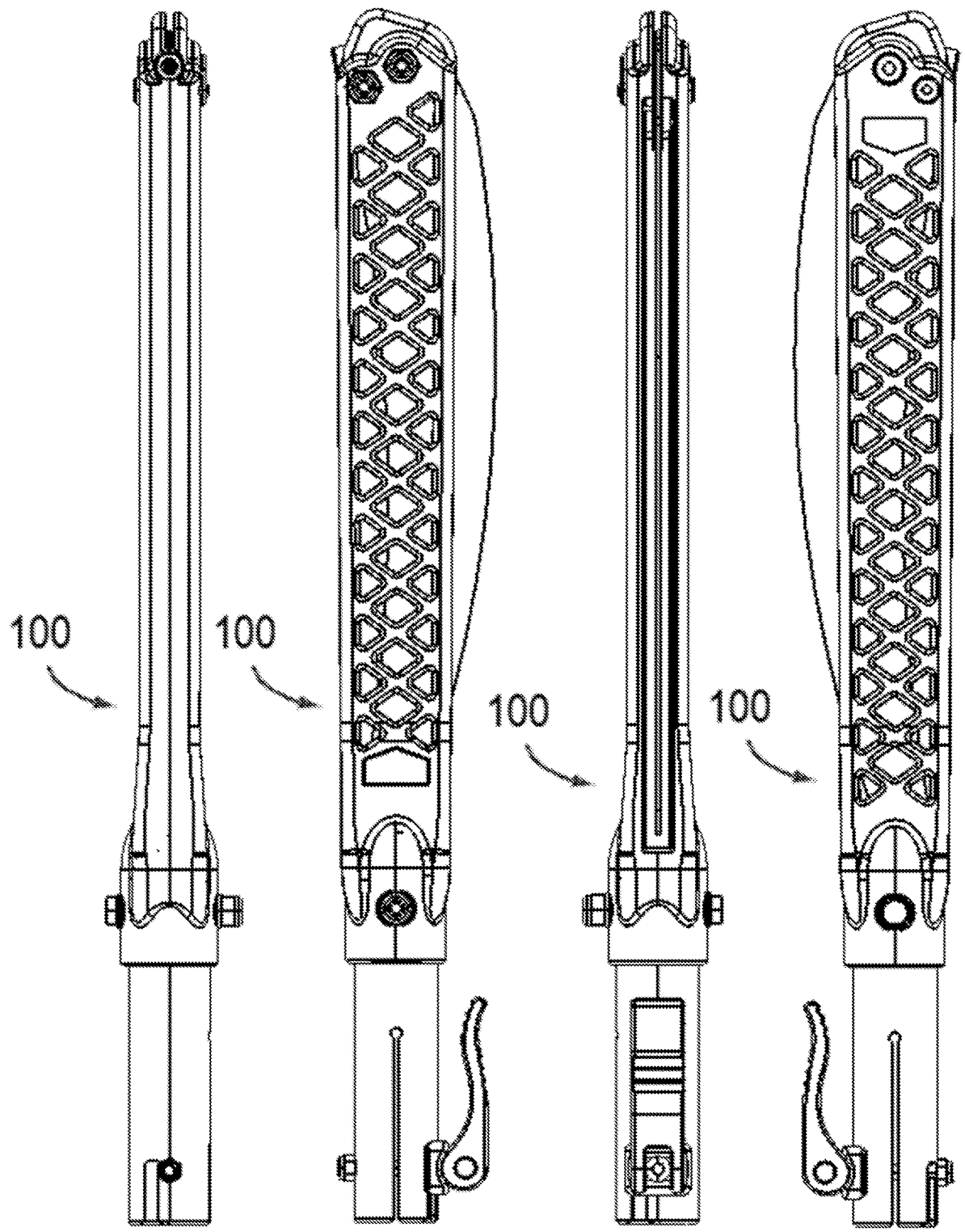
Figure 21:
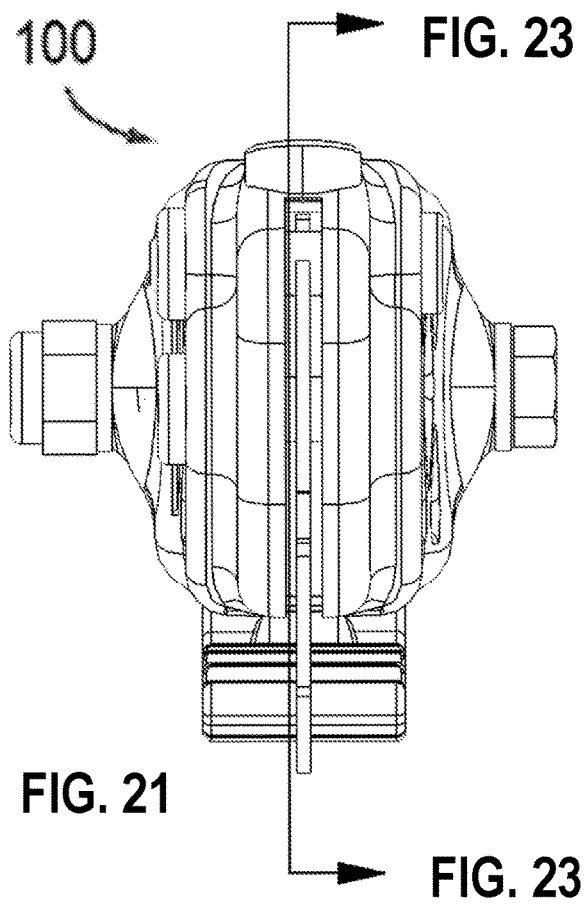
Figure 22:
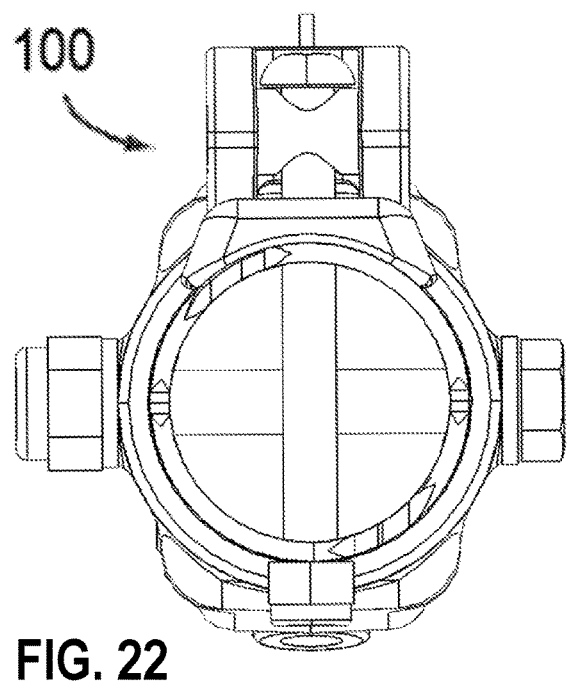
Figure 23:
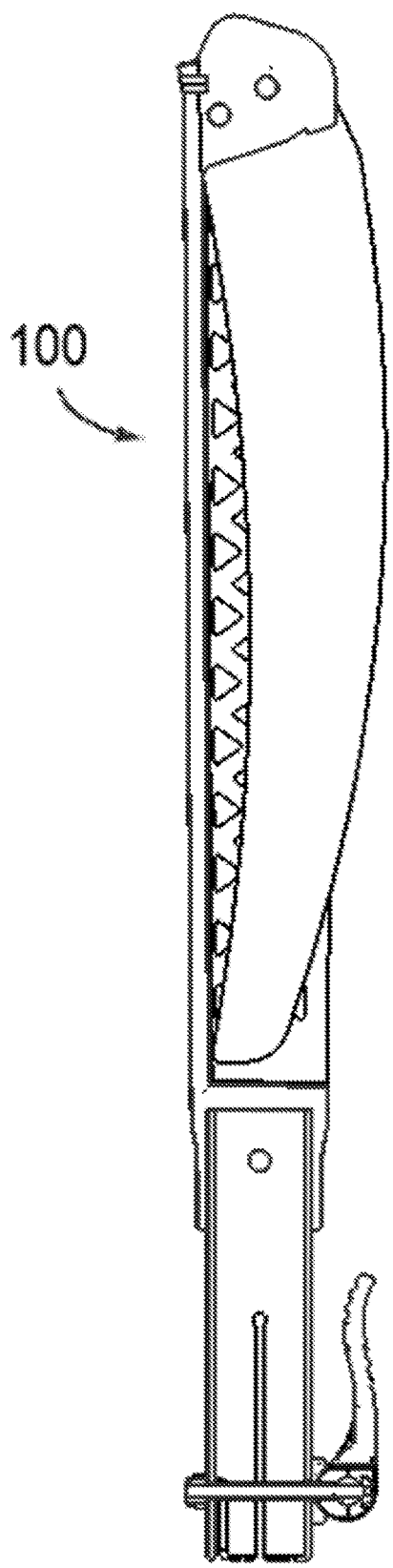
Figure 24:
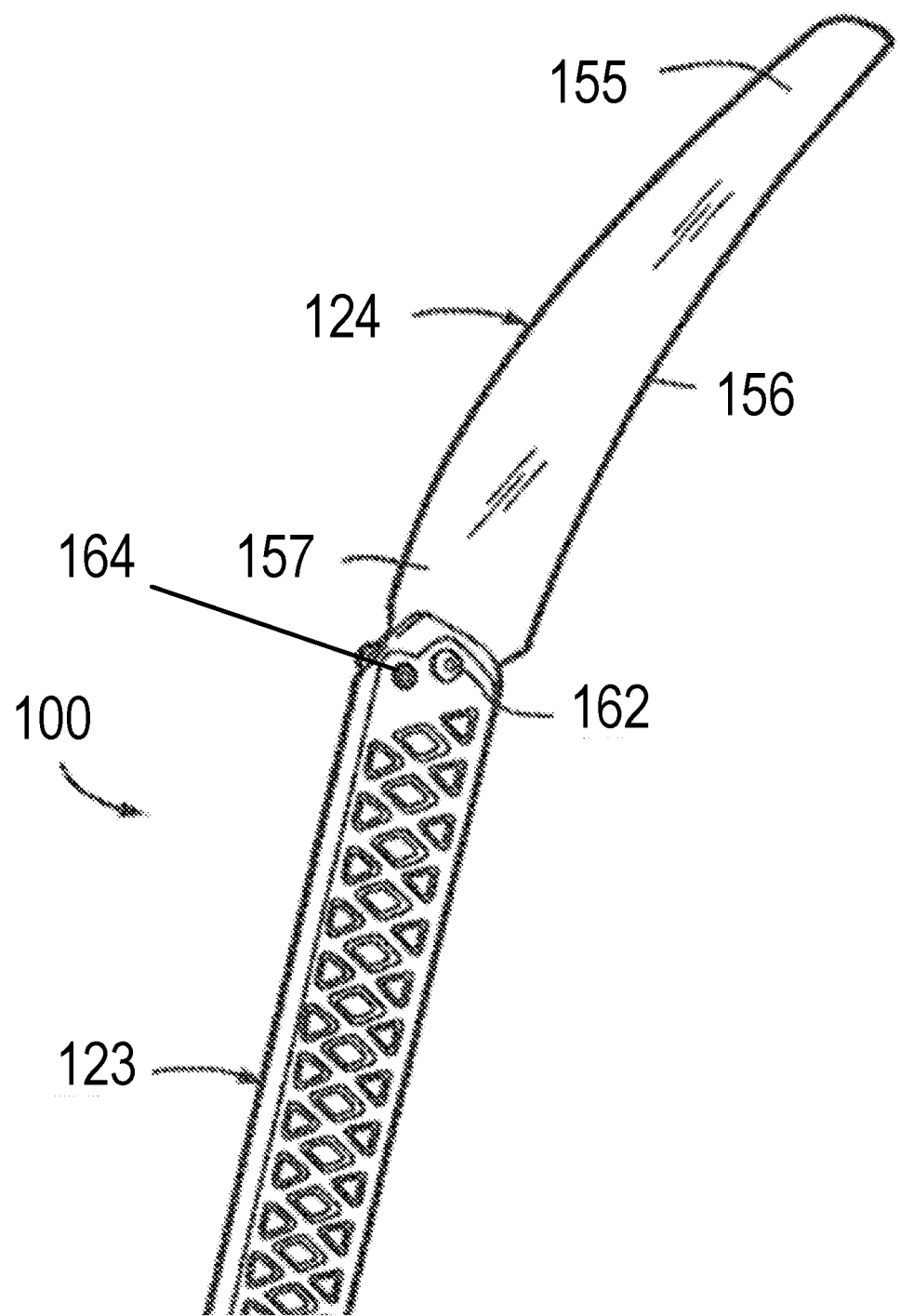

For purposes of reference, FIG. 15 presents a perspective view of the saw head assembly 100 illustrating the blade in a closed position and illustrating a tubular adapter at upper right including a cammed lock for holding the saw head assembly in place. FIG. 16 also shows a perspective view of the saw head assembly 100 illustrating the proximal end of the saw head assembly and showing the relationship between the tubular adapter and the guard 123 that receives the tubular adapter 133. FIGS. 17, 18, 19, and 20 each illustrate bottom, left side, top, and right side views of the saw head assembly 100. FIGS. 21-22 show distal end and proximal end views, respectively, of the saw head assembly 100. FIG. 21 also defines a cross sectional plane that defines a cut-away view of the saw head assembly illustrated in FIG. 23, wherein the relationship of the folded away blade 124 is shown with respect to the guard 123.

As illustrated, a tubular adapter 133 connects the guard 123 to a pole (e.g., 32) or other suitable handle. The blade 124, guard 123 and coupling can be considered to be a saw head assembly, as the combination of 24 and 33 also constitute a saw head assembly. The adapter 133 includes a distal, or guard-receiving end 134 that is received, preferably by an interference fit, into a port, or hole, defined by the proximal end of the guard 123. As illustrated, after fitting the distal end 134 of the adapter into the port of the guard 123, a cross-hole can be drilled through the components and a bolt can be directed therethrough and tightened, as illustrated, to hold the components together. Likewise, rivets or other suitable fasteners or adhesive can be used. Tubular adapter 133 on its proximal, pole facing end 136 can be provided with one or more (e.g., two) "L"-shaped slots as with embodiment herein of FIG. 3, and couple to the handle as set forth with that embodiment. In so doing, one or more longitudinal slots can be formed in the tubular adapter that compresses circumferentially to permit the clamp to deflect the proximal end 36 of the adaptor. The "L" shaped slots can have axial and circumferential portions that are slightly off axis or off of the circumferential direction. That is to say, they can be angled slightly off axis and be somewhat "V"-shaped. Alternatively, the can be curved to some extent. Thus, herein, reference to "L" shaped slots includes these sorts of variations.

Alternatively, and as set forth in the figures, an opposite arrangement is presented, wherein opposed, linear longitudinal slots 180 are provided on the adaptor 133, forming two halves of the tube that move closer together to grip the end of a handle. The distal end of the handle or pole, in this instance is provided with linear and circumferential slots 41, 42 as with tubular adapter 33 that slidably receive the proximal end of adapter 133 that slides along the linear slots and then is rotated to slide along the longitudinal portion of the slot. The clamp 138 is then activated to hold the saw head 100 tight against the pole. While a pole is not specifically illustrated with the "L"-shaped slots, those of skill in the art will understand that these slots look the same as those on the proximal end 36 of adaptor 33, but are formed on a distal end of the telescoping pole (e.g., 32) or other suitable handle. Moreover this embodiment, or the prior embodiments herein can be provided with "L"-shaped slots may be formed on the tubular adapter 33, 133 or on the distal end of the handle or pole (e.g., 32). The adapter 133 and casting forming the guard 123 are preferably both formed from aluminum, along with the pole (e.g., 32) or other handle for purposes of strength and the like.

Guard 123 is preferably cast of aluminum, and includes a proximal end and a distal end at which the blade 124 is pivotally mounted, and having a recess-forming body extending therebetween. The body includes opposing side panels and connecting strip that form a recess shaped to receive most (if not all of) the blade 124, including its cutting edge (i.e. along the blade's cutting teeth). Also, the side panels of the guard 123 include criss-crossing ribs and apertures that both maintain its strength and also lighten its total weight (and also reduce total material).

The saw blade 124 (FIG. 24) includes a blade end 155 including a cutting edge 156 with teeth, and with a mount end 157 including a pivot hole and an arcuate edge extending partially around the pivot hole. The arcuate edge and can include two indentations as set forth in U.S. Pat. No. 9,532,510, the first detent holding the blade 124 in its extended use position, and the second detent holding the blade 124 in its storage position. A pivot pin 162 engages the pivot hole and pivotally mounts the blade 124 to the guard 123 for movement between the extended use position (shown in FIG. 24) and a storage position (shown in FIG. 15). A detent pin 164 can be provided to selectively frictionally engage the indentations on the blade 124 to hold the blade 124 in a selected one of the positions relative to the guard 123.

It is contemplated that the detent pin 164 can be resilient so that the blade 124 can be moved with enough force to overcome the friction retaining the blade 124 in a selected detent position. Alternatively, it is contemplated that the detent pin 164 can be made to be telescopingly movable within its mounting hole in the guard 123 and be spring biased, such that the detent pin 164 must be moved/shifted in order to disengage it from the detent indentations. For example, a notch (not specifically shown) can be cut into detent pin 164 so that upon being shifted, the notch aligns with the blade 124 to allow the blade 124 to be rotated to anew angular position on the component 123. This later alternative retains the blade 124 in its selected position much more positively than the first alternative.

As set forth in U.S. Pat. No. 9,532,510 a set screw can be threaded into guard 123 at a location where the end of its shaft abuts the edge of the blade 124. The set screw can be adjustable and can be used to eliminate looseness of the blade 124 relative to the blade-holding component 123 when the blade 123 is in the expanded use position. This provides increased stability and improved feel to a user, thus providing a better quality feel.

Figure 25:
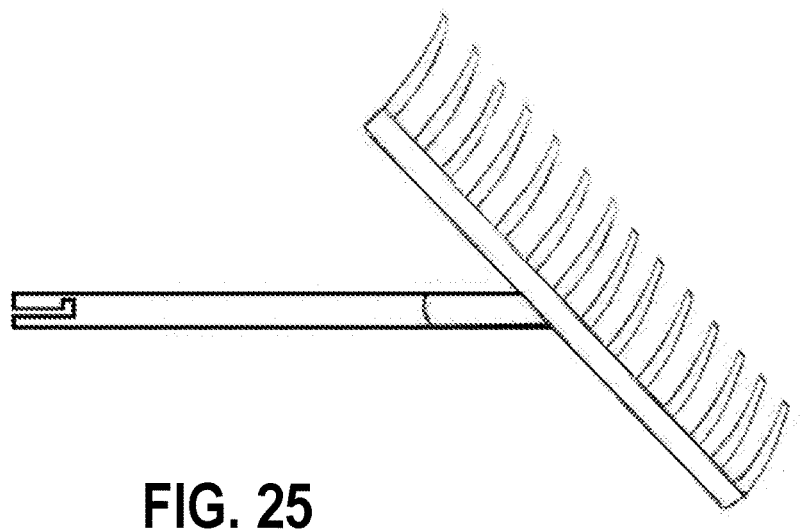
FIGS. 25-26 illustrate additional accessories that can be attached to a telescoping pole using couplings as set forth herein.
Figure 26:
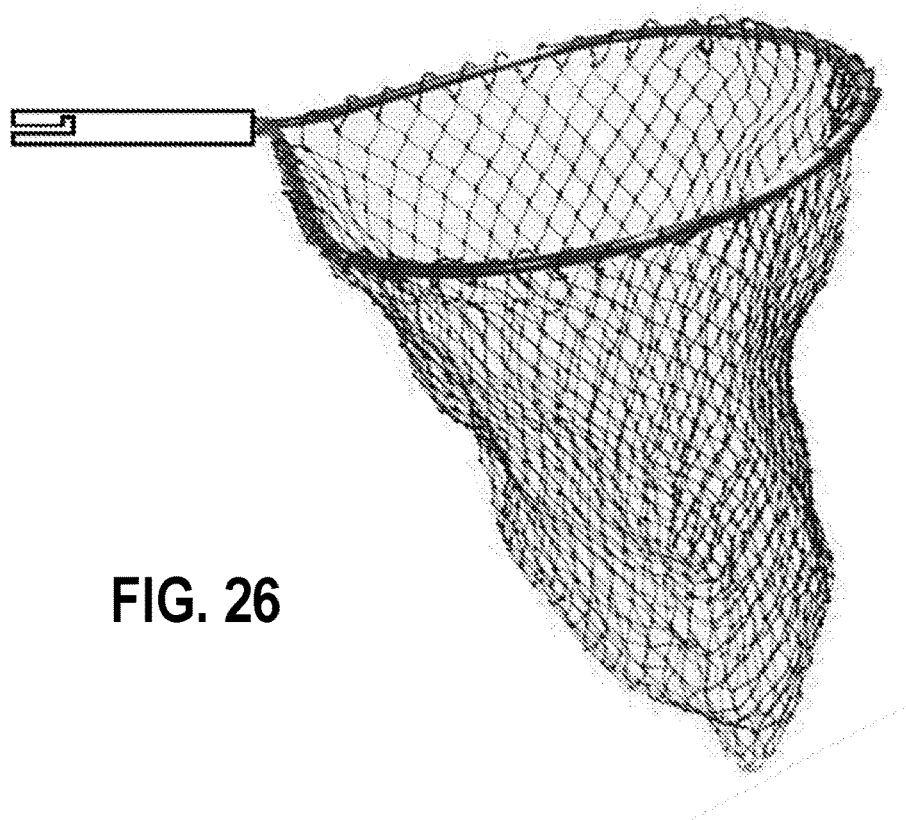

As illustrated in FIGS. 25-26, other accessories can be attached to the distal end of the telescoping pole (e.g., 32) herein, wherein L-shaped slots are provided in the distal end of the pole, or in the proximal end of the accessory. This is accomplished, for example, in the embodiment of FIG. 25 by attaching an adaptor (e.g, by swaging, bolting, adhesive, welding, and the like) to a fishing net head having a frame connected to a net. A similar modification can be made to a rake head as illustrated in FIG. 26. But, it will be appreciated that additional accessories can be attached to the end of the pole using the same kind of connection, including a light bulb holder/changer, such as any of those set forth in U.S. Pat. Nos. 8,104,380, 5,148,723, 6,553,872, 8,875,600, 9,070,544 a pruner that is activated using a pull rope, such as any of those set forth in U.S. Pat. Nos. 7,937,839, 2,093,932. Removable distal end attachments can similarly be provided that can include an end to turn a telescoping pole (e.g., 32) into a push poles for boating, like those set forth in U.S. Pat. Nos. 6,168,480, and 7,942,106, or dock hooks, deck brushes, and decoy hooks, brooms, brushes, grabbing claws, magnets, and the like. All patents and patent applications referred to herein are incorporated by reference in their entireties for any purpose whatsoever.

The present innovative design provides a surprisingly strong and durable connection. This strength and stress distribution is accomplished in significant part by the overlapping and large section of the tubes on the adapter and pole, with a precision fit mating tube of the adapter being made from medium carbon steel. When rotated into the locked position, the steel tube adapter simply cannot be pulled off the end of the pole, which is a significant benefit given the forces that occur when using the apparatus to saw off a limb. The steel tube adapter provides a surprising strength at the connection point due to the amount of surface area contact between the mating tub components of the adapter and pole (and between the adapter and blade). The overall connection and manufacture of components of the present apparatus is very simple and strong. No aluminum or plastic is tensioned or stressed in a way leading to premature and/or unexpected catastrophic failure. Also, the present arrangement facilitates quick change between using the pole-supported blade and adapter to "pole-saw", and using the adapter-only-supported arrangement to manually "short-saw" while using the adapter as a palm-engaging handle.

Thus, it is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A tool comprising:
  a pole or handle having a proximal end, and a distal anchoring end for attachment to an accessory;
  an accessory having a proximal end that includes a tubular adapter having a proximal pole-engaging end, that is cylindrically shaped to telescopingly engage the anchoring end of the pole, wherein:
    one of the pole engaging end of the tubular adapter and the distal anchoring end of the pole or handle includes at least one "L"-shaped slot, said at least one "L"-shaped slot having an axial portion extending axially into said one of the pole engaging end of the tubular adapter and the distal anchoring end of the pole or handle, and a second, circumferential portion extending circumferentially from said axial portion of said "L" shaped slot and around a portion of said one of the pole engaging end of the tubular adapter and the distal anchoring end of the pole or handle;
  a clamp extended through aligned holes in the other of the pole engaging end of the tubular adapter and the distal anchoring end of the pole or handle to secure the accessory in place with respect to the distal end of the pole or handle, the clamp including a shaft that is configured to slip into said at least one "L"-shaped slot and then rotate into said circumferential portion of said at least one "L"-shaped slot so that the accessory and pole or handle cannot slide longitudinally out of engagement with one another, the clamp further including a cammed handle that is movable between a first position wherein the accessory and pole or handle can be rotated with respect to each other, and that is movable to a clamped position wherein the accessory and pole or handle are clamped with respect to each other and frictionally prevented from rotation with respect to each other.

2. The tool of claim 1, wherein the accessory includes a saw head assembly, the saw head assembly having a proximal end that is attached to a proximal end of said tubular adapter.

3. The tool of claim 2, wherein the saw head assembly can be removed from the pole and used together as a hand-held saw with a short handle.

4. The tool of claim 2, wherein the at least one "L"-shaped slot is formed in the pole engaging end of the tubular adapter.

5. The tool of claim 2, wherein the at least one "L"-shaped slot is formed in the distal anchoring end of the pole or handle.

6. The tool of claim 1, wherein the accessory includes a pruner, the pruner having a proximal end that is attached to a proximal end of said tubular adapter.

7. The tool of claim 1, wherein the accessory includes a fishing net, the fishing net having a proximal end that is attached to a proximal end of said tubular adapter.

8. The tool of claim 1, wherein the accessory includes a rake, the rake having a proximal end that is attached to a proximal end of said tubular adapter.

9. The tool of claim 1, wherein the clamp includes first and second tube-engaging pieces, the first tube-engaging piece having a first cylindrical surface engaging the anchoring end of the pole and having an arcuate surface operably slidably engaging a cam on the cammed handle so that when rotated, the cammed handle pulls the shaft to thus tension the second tube-engaging piece laterally to create friction.

10. The tool of claim 1, wherein said at least one "L"-shaped slot includes a plurality of "L"-shaped slots.

11. The tool of claim 1, wherein said at least one "L"-shaped slot includes a pair of opposing "L"-shaped slots disposed 180 degrees from each other circumferentially about said tubular adapter or said pole or handle.

12. The tool of claim 1, wherein the at least one "L"-shaped slot is formed in the pole engaging end of the tubular adapter.

13. The tool of claim 1, wherein the at least one "L"-shaped slot is formed in the distal anchoring end of the pole or handle.

* * * * *